United States Patent
Roberge et al.

(10) Patent No.: US 10,598,378 B2
(45) Date of Patent: Mar. 24, 2020

(54) BONDED COMBUSTOR WALL FOR A TURBINE ENGINE

(71) Applicant: United Technologies Corporation, Hartford, CT (US)

(72) Inventors: Gary D. Roberge, Tolland, CT (US); Grant O. Cook, III, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 355 days.

(21) Appl. No.: 15/025,012

(22) PCT Filed: Oct. 7, 2014

(86) PCT No.: PCT/US2014/059486
§ 371 (c)(1),
(2) Date: Mar. 25, 2016

(87) PCT Pub. No.: WO2015/054244
PCT Pub. Date: Apr. 16, 2015

(65) Prior Publication Data
US 2016/0238248 A1 Aug. 18, 2016

Related U.S. Application Data (60) Provisional application No. 61/887,744, filed on Oct. 7, 2013.

(51) Int. Cl.
*F23R 3/00* (2006.01)
*F02C 7/18* (2006.01)
*F23R 3/06* (2006.01)

(52) U.S. Cl.
CPC ............... *F23R 3/002* (2013.01); *F02C 7/18* (2013.01); *F23R 3/005* (2013.01); *F23R 3/007* (2013.01);
(Continued)

(58) Field of Classification Search
CPC .. F23R 3/002; F23R 3/007; F23R 3/06; F23R 2900/00017; F23R 2900/0018;
(Continued)

(56) References Cited

U.S. PATENT DOCUMENTS 3,678,570 A * 7/1972 Paulonis ............... B23K 20/16
228/194
5,220,786 A 6/1993 Campbell
(Continued)

FOREIGN PATENT DOCUMENTS

DE 10261071 7/2004

OTHER PUBLICATIONS

Cook, Grant; Sorensen, Carl; "Overview of transient liquid phase and partial transient liquid phase bonding"; Jan. 19, 2011 (Year: 2011).*
(Continued)

*Primary Examiner* — Carlos A Rivera
(74) *Attorney, Agent, or Firm* — Getz Balich LLC (57) ABSTRACT

A combustor wall is provided for a turbine engine. The combustor wall includes a shell, a heat shield and a combustion chamber. The heat shield is connected to the shell by a bonded connection, and defines a portion of the combustion chamber. A cooling cavity is defined between the shell and the heat shield.

14 Claims, 4 Drawing Sheets

(52) U.S. Cl.
CPC ...... *F23R 3/06* (2013.01); *F23R 2900/00017* (2013.01); *F23R 2900/00018* (2013.01); *F23R 2900/03042* (2013.01); *F23R 2900/03044* (2013.01)

(58) Field of Classification Search
CPC .. F23R 2900/03041; F23R 2900/03042; F23R 2900/03044; F05D 2240/15
See application file for complete search history.

(56) References Cited

U.S. PATENT DOCUMENTS

| | | | |
|---|---|---|---|
| 5,234,152 A * | 8/1993 | Glaeser | B23K 20/023 228/121 |
| 5,372,298 A * | 12/1994 | Glaeser | B23K 20/023 228/121 |
| 5,749,219 A | 5/1998 | DuBell | |
| 6,397,581 B1 * | 6/2002 | Vidal | F02K 1/822 60/267 |
| 6,602,053 B2 * | 8/2003 | Subramanian | C25D 1/02 416/241 B |
| 7,093,441 B2 | 8/2006 | Burd et al. | |
| 7,140,185 B2 | 11/2006 | Burd | |
| 7,146,815 B2 | 12/2006 | Burd | |
| 7,363,763 B2 | 4/2008 | Coughlan, III et al. | |
| 7,954,325 B2 | 6/2011 | Burd et al. | |
| 8,015,829 B2 | 9/2011 | Coughlan, III et al. | |
| 8,056,342 B2 | 11/2011 | Shelley et al. | |
| 8,359,865 B2 | 1/2013 | Dierberger et al. | |
| 8,359,866 B2 | 1/2013 | Dierberger et al. | |
| 2004/0194941 A1 | 10/2004 | Larrieu et al. | |
| 2006/0042257 A1 | 3/2006 | Stastny | |
| 2006/0059916 A1 | 3/2006 | Cheung et al. | |
| 2008/0304959 A1 | 12/2008 | Benoit et al. | |
| 2008/0307793 A1 | 12/2008 | Benoit et al. | |
| 2009/0049794 A1 * | 2/2009 | Barone | B23K 1/0012 52/745.21 |
| 2010/0095678 A1 * | 4/2010 | Hawie | F01D 9/023 60/752 |
| 2010/0095679 A1 | 4/2010 | Rudrapatna et al. | |
| 2010/0183428 A1 | 7/2010 | Liang | |
| 2013/0000309 A1 * | 1/2013 | Dierberger | F23R 3/002 60/752 |
| 2013/0108445 A1 | 5/2013 | Suciu et al. | |

OTHER PUBLICATIONS

Y. lino, Partial transient liquid-phase metals layer technique of ceramic-metal bonding, 1990 (Year: 1990).*
Atabaki, Effect of heating rate on the partial transient liquid phase diffusion bonded A/Mg2Si Metal Matrix composite and Magnesium Alloy (AZ91D) Couple, 2011 (Year: 2011).*
EP search report for EP14852801.1 dated Oct. 7, 2016.
European Patent Office Official Letter for EP Application No. 14852801.1 dated Oct. 23, 2018.

* cited by examiner

BONDED COMBUSTOR WALL FOR A TURBINE ENGINE

CROSS-REFERENCE TO RELATED APPLICATIONS

This application claims priority to PCT Patent Application No. PCT/US14/59486 filed Oct. 7, 2014, which claims priority to U.S. Provisional Application Ser. No. 61/887,744 filed Oct. 7, 2013, which are hereby incorporated herein by reference in their entireties.

BACKGROUND OF THE INVENTION

1. Technical Field

This disclosure relates generally to a turbine engine and, more particularly, to a combustor for a turbine engine.

2. Background Information

A floating-wall combustor for a turbine engine typically includes a bulkhead that extends radially between inner and outer combustor walls. Each of the combustor walls includes a shell and a heat shield, which defines a radial side of a combustion chamber. The heat shield is mechanically fastened to the respective shell by a plurality of threaded studs.

The shell and the heat shield are typically formed from nickel alloy material. The melting point and thermal erosion characteristics of this nickel alloy material, however, limit an upper-temperature bound of gas within the combustion chamber and, thus, may limit performance and efficiency of the turbine engine. In addition, the shell and/or the heat shield may thermally warp during engine operation causing gas leakage between the shell and the heat shield. Such gas leakage may further reduce turbine engine performance and efficiency.

There is a need in the art for an improved turbine engine combustor.

SUMMARY OF THE DISCLOSURE

According to an aspect of the invention, a combustor wall for a turbine engine is provided. The combustor wall includes a combustor shell and a combustor heat shield. The shell extends axially along a centerline. The heat shield extends axially along the centerline, and is connected to the shell by a bonded connection. A cooling cavity is defined radially between the shell and the heat shield.

According to another aspect of the invention, a combustion section is provided for a turbine engine. The combustion section includes a combustor. This combustor includes a shell, a heat shield and a combustion chamber. The heat shield is connected to the shell by a bonded connection, and defines a portion of the combustion chamber. A cooling cavity is defined between the shell and the heat shield.

The bonded connection may be a transient liquid phase bonded connection. The bonded connection may be a partial transient liquid phase bonded connection. The bonded connection may be a brazed connection. The bonded connection may be a welded connection.

The bonded connection may bond the heat shield to the shell.

The combustor or the combustor wall may include an intermediate element. This intermediate element may be connected radially and/or axially between the heat shield and the shell. The bonded connection may bond the heat shield to the intermediate element. Alternatively, the bonded connection may bond the intermediate element to the shell.

The heat shield may be bonded to the intermediate element by a second bonded connection where the bonded connection bonds the intermediate element to the shell. Alternatively, the intermediate element may be bonded to the shell by a second bonded connection where the bonded connection bonds heat shield to the intermediate element.

The intermediate element may be configured as or otherwise include a strain isolator and/or any other combustor wall component.

The shell may be formed from a first material. The heat shield may be formed from a second material. This second material may be different than the first material. For example, the first material may be or otherwise include metallic material. The second material may be or otherwise include composite material. Alternatively, the second material may be the same as the first material.

The combustor or the combustor wall may include a combustor first wall, a combustor second wall and a combustor bulkhead. The bulkhead may be connected radially between the first wall and the second wall. The first wall, the second wall and the bulkhead may define a combustion chamber. The first wall may be an inner wall and the second wall may be an outer wall. Alternatively, the first wall may be an outer wall and the second wall may be an inner wall. The first wall, the second wall or the bulkhead may be formed by the shell and the heat shield.

The shell may include one or more cooling apertures (e.g., impingement apertures) that are fluidly coupled with the cooling cavity. The heat shield may also or alternatively include one or more cooling apertures (e.g., effusion apertures) that are fluidly coupled with the cooling cavity.

The heat shield may include a base plate and a protrusion. The protrusion may extend radially and/or axially out from the base plate, and may be connected to the shell by the bonded connection. The protrusion may be configured as or otherwise include a rail.

The foregoing features and the operation of the invention will become more apparent in light of the following description and the accompanying drawings.

DETAILED DESCRIPTION OF THE INVENTION

Figure 1:
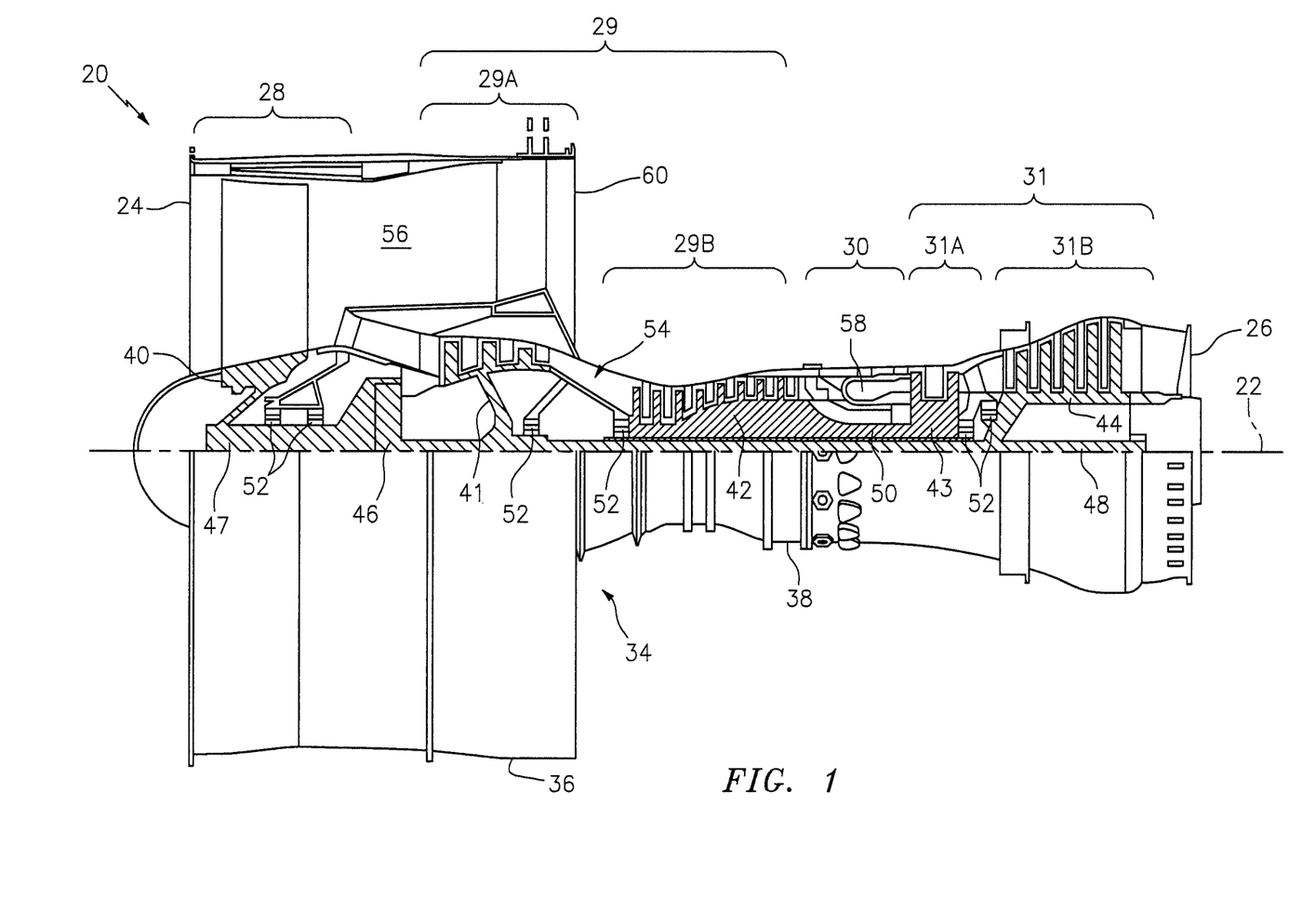
FIG. 1 is a side cutaway illustration of a geared turbine engine.

FIG. 1 is a side cutaway illustration of a geared turbine engine 20. This engine 20 extends along an axial centerline 22 between an upstream airflow inlet 24 and a downstream airflow exhaust 26. The engine 20 includes a fan section 28, a compressor section 29, a combustor section 30 and a turbine section 31. The compressor section 29 includes a low-pressure compressor (LPC) section 29A and a high-pressure compressor (HPC) section 29B. The turbine section 31 includes a high-pressure turbine (HPT) section 31A and a low-pressure turbine (LPT) section 31B. The engine sections 28-31 are arranged sequentially along the centerline 22 within an engine housing 34, which includes a first engine case 36 (e.g., a fan nacelle) and a second engine case 38 (e.g., a core nacelle).

Each of the engine sections 28, 29A, 29B, 31A and 31B includes a respective rotor 40-44. Each of the rotors 40-44 includes a plurality of rotor blades arranged circumferentially around and connected to (e.g., formed integral with or mechanically fastened, welded, brazed, adhered or otherwise bonded to) one or more respective rotor disks. The fan rotor 40 is connected to a gear train 46 (e.g., an epicyclic gear train) through a shaft 47. The gear train 46 and the LPC rotor 41 are connected to and driven by the LPT rotor 44 through a low speed shaft 48. The HPC rotor 42 is connected to and driven by the HPT rotor 43 through a high-speed shaft 50. The shafts 47, 48 and 50 are rotatably supported by a plurality of bearings 52. Each of the bearings 52 is connected to the second engine case 38 by at least one stator such as, for example, an annular support strut.

Air enters the engine 20 through the airflow inlet 24, and is directed through the fan section 28 and into an annular core gas path 54 and an annular bypass gas path 56. The air within the core gas path 54 may be referred to as "core air". The air within the bypass gas path 56 may be referred to as "bypass air".

The core air is directed through the engine sections 29-31 and exits the engine 20 through the airflow exhaust 26. Within the combustor section 30, fuel is injected into an annular combustion chamber 58 and mixed with the core air. This fuel-core air mixture is ignited to power the engine 20 and provide forward engine thrust. The bypass air is directed through the bypass gas path 56 and out of the engine 20 through a bypass nozzle 60 to provide additional forward engine thrust. Alternatively, the bypass air may be directed out of the engine 20 through a thrust reverser to provide reverse engine thrust.

Figure 2:
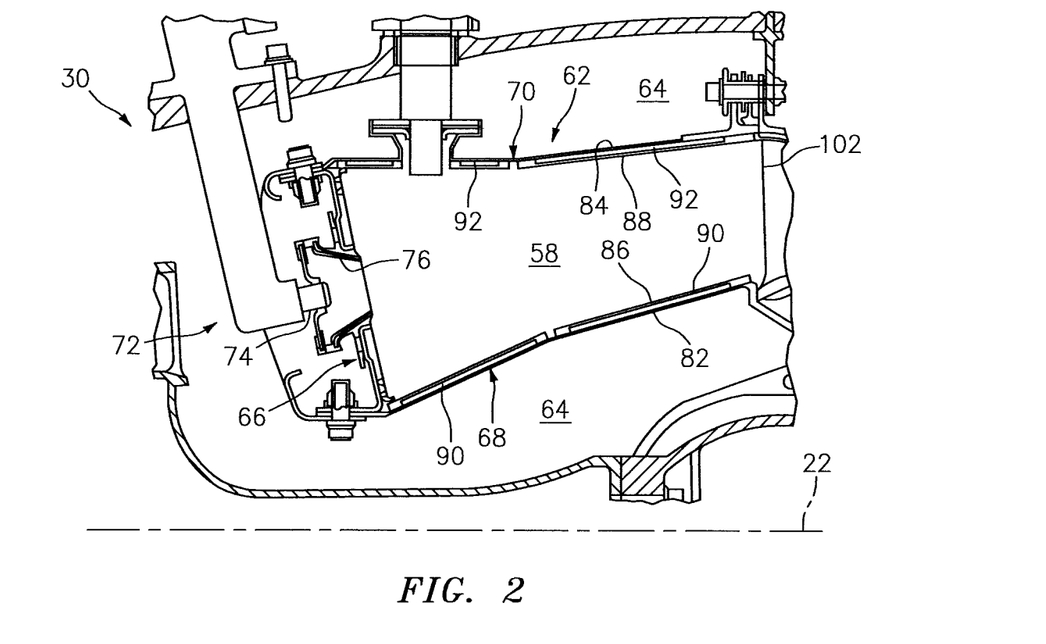
FIG. 2 is a side sectional illustration of a portion of a combustor section.
Figure 3:
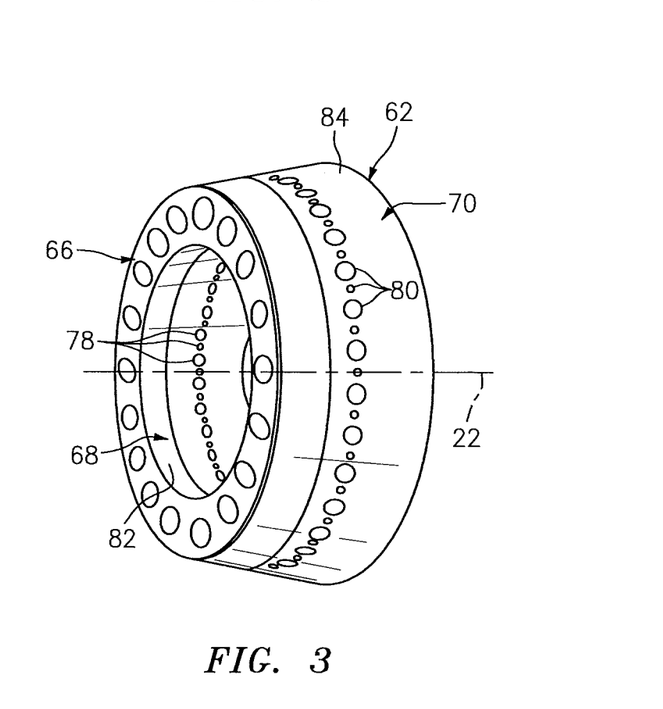
FIG. 3 is a perspective illustration of a portion of a combustor.

Referring to FIGS. 2 and 3, the combustor section 30 includes a combustor 62 arranged within an annular plenum 64. This plenum 64 receives compressed core air from the compressor section 29 (see FIG. 1), and provides the core air to the combustor 62 as described below in further detail.

The combustor 62 includes an annular combustor bulkhead 66, a tubular combustor inner wall 68, a tubular combustor outer wall 70, and a plurality of fuel injector assemblies 72. The bulkhead 66 extends radially between and is connected to the inner wall 68 and the outer wall 70. The inner wall 68 and the outer wall 70 each extends axially along the centerline 22 from the bulkhead 66 towards the turbine section 31 (see FIG. 1), thereby defining the combustion chamber 58. The fuel injector assemblies 72 are disposed around the centerline 22, and mated with the bulkhead 66. Each of the fuel injector assemblies 72 includes a fuel injector 74 mated with a swirler 76. The fuel injector 74 injects the fuel into the combustion chamber 58. The swirler 76 directs some of the core air from the plenum 64 into the combustion chamber 58 in manner that facilitates mixing the core air with the injected fuel. Quench apertures 78 and 80 in the inner and/or the outer walls 68 and 70 direct additional core air into the combustion chamber 58 for combustion.

Figure 4:
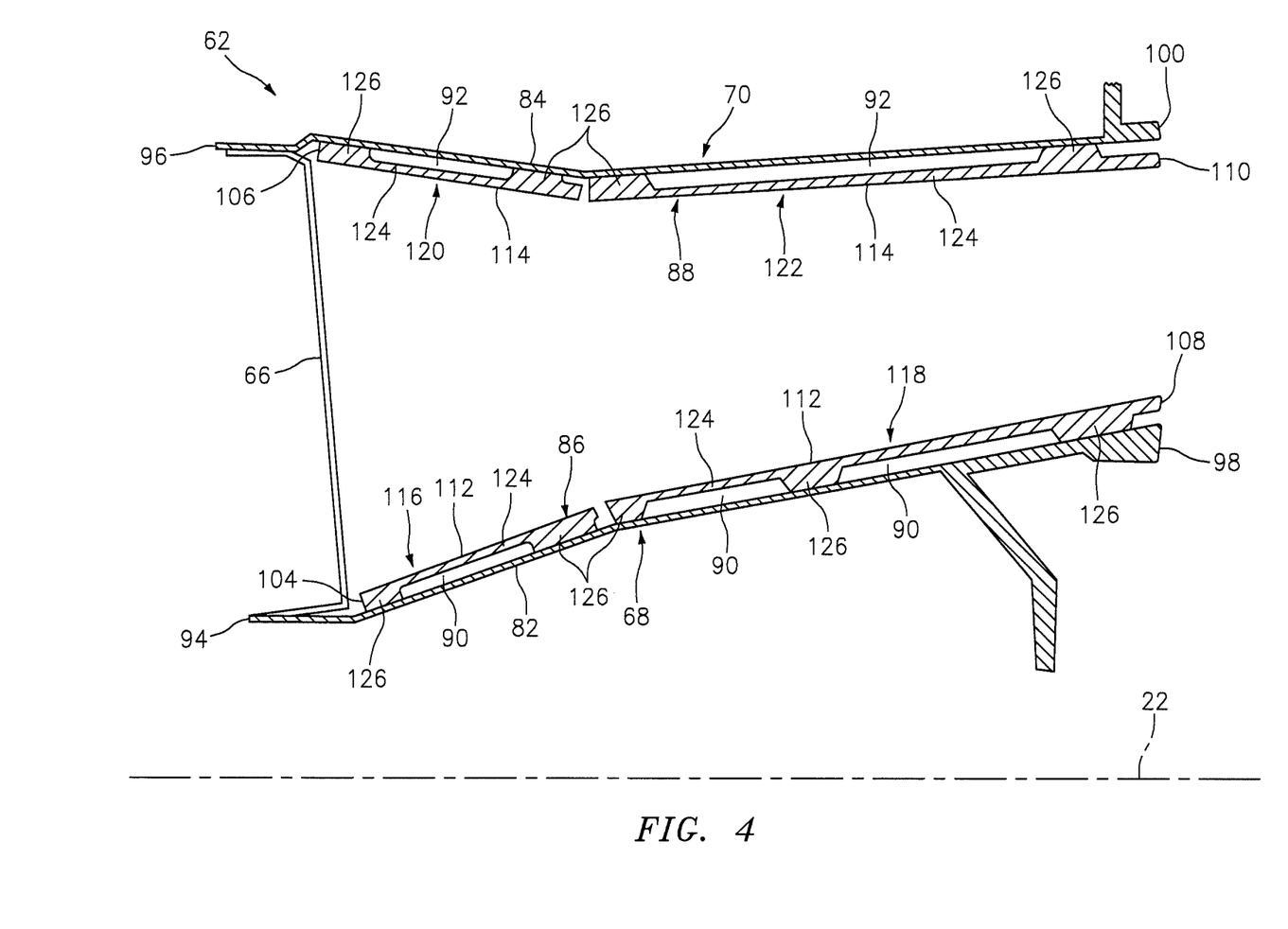
FIG. 4 is a side sectional illustration of a portion of a combustor.

Referring to FIG. 4, the inner wall 68 and/or the outer wall 70 each have a multi-walled structure; e.g., a hollow dual-walled structure. The inner wall 68 and the outer wall 70 of FIG. 4, for example, each respectively includes a tubular combustor shell 82, 84, a tubular combustor heat shield 86, 88 and one or more inner wall cooling cavities 90, 92.

Each shell 82, 84 respectively extends axially along the centerline 22 between an upstream end 94, 96 and a downstream end 98, 100. Each shell 82, 84 is connected to the bulkhead 66 at the upstream end 94, 96. Each shell 82, 84 may be connected to a stator vane assembly 102 (see FIG. 2) at the downstream end 98, 100.

Each shell 82, 84 may be cast, forged, machined and/or otherwise formed from metallic material (e.g., sheet metal) such as, for example, nickel (Ni) alloy. Examples of high-temperature nickel alloy include, but are not limited to, IN625 alloy (manufactured by Inco Alloys International, Inc. of Huntington, W. Va., United States) and Hastelloy® X alloy (manufactured by Haynes International, Inc. of Kokomo, Ind., United States). Each shell 82, 84, of course, may also be formed from metallic and/or non-metallic materials other than those described above.

Each heat shield 86, 88 respectively extends axially along the centerline 22 between an upstream end 104, 106 and a downstream end 108, 110. Each heat shield 86, 88 may respectively include a plurality of heat shield panels 112, 114. The panels 112 may be arranged into one or more axial sets 116 and 118, where the panels 112 in each set 116, 118 are disposed around the centerline 22 and forming a hoop. The panels 114 may be arranged into one or more axial sets 120 and 122, where the panels 114 in each set 120, 122 are disposed around the centerline 22 and forming a hoop. Alternatively, the heat shield 86 and/or 88 may be configured from one or more tubular bodies.

One or more of the panels 112, 114 may each include a panel base 124 and one or more protrusions 126. The panel base 124 may be configured as a generally curved (e.g., arcuate) plate that extends axially along and circumferentially around the centerline 22. The protrusions 126 extend radially outward or inward from the panel base 124. Each of the protrusions 126 of FIG. 4 is configured as a circumferentially extending rail. However, one or more of the panels 112, 114 may also or alternatively include one or more other types of protrusions; e.g., axially extending rails, discrete pedestals, etc.

Each heat shield 86, 88 and its panels 112, 114 may be cast, forged, machined and/or otherwise formed from metallic and/or non-metallic materials. Examples of high-temperature metallic materials include, but are not limited to, nickel alloy, nickel-aluminum alloy and molybdenum alloy. Examples of high-temperature non-metallic materials include, but are not limited to, monolithic ceramic and ceramic matrix composite. Examples of a monolithic ceramic include, but are not limited to, monolithic $Si_3N_4$, $Al_2O_3$, SiC, WC, and $ZrO_2$. An example of a ceramic matrix composite is melt-infiltrated SiC/SiC. Each heat shield 86, 88, of course, may also be formed from metallic and/or non-metallic materials other than those described above. In addition, one or more of the panels 112, 114 may be formed from different materials.

The heat shield 86 circumscribes the shell 82, and defines an inner side of the combustion chamber 58. The heat shield 88 is arranged radially within the shell 84, and defines an outer side of the combustion chamber 58.

The heat shields 86 and 88 are respectively connected to the shells 82 and 84, thereby defining the cooling cavities 90 and 92. The cooling cavities 90 and 92 extend circumferentially and axially between the protrusions 126; e.g., the circumferentially and axially extending rails. The cooling cavities 90 and 92 extend radially between the panel bases 124 and the respective shells 82 and 84. One or more of the cooling cavities 90 and 92 may each be a discrete cavity.

One or more of the cooling cavities 90 and 92 may also or alternatively be fluidly coupled to one or more adjacent cooling cavities.

The heat shields 86 and 88 are connected to the shells 82 and 84 by one or more bonded connections. One or more of the protrusions 126, for example, may each be connected directly to the respective shell 82, 84 by a transient liquid phase (TLP) or a partial transient liquid phase (PTLP) bond; i.e., the respective protrusions 126 are TLP-bonded or PTLP-bonded to the shell 82, 84. Notably, such a TLP-bonded connection or a PTLP-bonded connection may connect dissimilar and/or non-weldable materials together. One or more of the panels 112 and 114 therefore may be formed from non-weldable materials such as the high-temperature non-metallic materials described above, and one or more of the shells 82 and 84 may be formed from the metallic materials described above. Of course, the TLP-bonded connection or the PTLP-bonded connection may also be used to connect similar and/or weldable materials together. In addition, the (e.g., TLP or PTLP) bonded connection may reduce or substantially eliminate gas leakage between the shell 82, 84 and the protrusions 126.

TLP bonding may be described as a hybrid of brazing and diffusion bonding processes that produces bonds at comparatively lower temperatures than brazing and lower temperatures and/or pressures than diffusion bonding. In TLP bonding, one or more interlayers are disposed in joints between components (e.g., the shell 82, 84 and the heat shield 86, 88) that are to be bonded together. The components are then heated to a bonding temperature to melt the interlayer(s), which fills gaps between the components. Certain alloying elements of the interlayer(s) inter-diffuse with the materials of the components, causing a compositional change in the joint which isothermally solidifies and creates a bond between the two components. The bonding temperature can be held for an additional period of time to allow more homogenous diffusion. TLP bonding may apply little or no pressure to the components as compared to diffusion bonding, and thus may mitigate or substantially prevents distortion of the components during the bonding process. The composition of the interlayer(s) can be selected according to the compositions of the materials that are being bonded together.

PTLP bonding is a variation of TLP bonding which may be used for joining non-metallic materials together. In PTLP bonding, a multi-layer interlayer may be disposed in joints between components (e.g., the shell 82, 84 and the heat shield 86, 88) that are to be bonded together. This multi-layer interlayer may include three layers: a thick refractory layer that does not melt during the process, and two thinner layers on each side of the thick refractory core layer. These layers may be formed of pure elements, though alloys can alternatively be used for one or more of the layers. The components are then heated to a bonding temperature to melt the thin layers of the multi-layer interlayer. These thin layers diffuse into the thick refractory layer of the interlayer, causing a compositional change in the joint which isothermally solidifies and creates a bond between the two components. Substantially simultaneously, the thin liquid layers wet (adhere to) the non-metallic components. The wetting is brought about by the thin layers' composition(s) and/or an alloy of the thin layer(s) with the refractory core layer. The bonding temperature can be held for an additional period of time to allow more homogenization of the resulting PTLP bond, further increasing the bond's re-melting temperature. PTLP bonding may apply little or no pressure to the components as compared to diffusion bonding, and thus may mitigate or substantially prevents distortion of the components during the bonding process. The composition of the interlayer(s) can be selected according to the compositions of the materials of the segments that are being bonded together. Thus, the selection of first and second materials for bonded segments can be subject to a mutually compatible interlayer or interlayers.

Various bonding material formats may be employed for TLP bonding or PTLP bonding. Suitable bonding material formats may include, but are not limited to, an alloy foil, a foil formed from a pure metal, multiple layers of elemental foils, or combinations thereof. Other formats such as, but not limited to, powder, powder compact, braze paste, or one or more metallic layers applied by electroplating, physical vapor deposition, or another suitable metal deposition process, may also be used.

While the heat shields 86 and 88 are described above as being TLP-bonded or PTLP-bonded to the shells 82 and 84, the present invention is not limited to such a bonding technique. In some embodiments, for example, one or more of the protrusions 126 may each be connected to the respective shell 82, 84 by a brazed connection. In some embodiments, one or more of the protrusions 126 may each be connected to the respective shell 82, 84 by a welded connection.

In some embodiments, one or more of the panels 112 and 114 may each include one or more cooling features. One or more of the shells 82 and 84 may also or alternatively include one or more cooling features. Examples of a cooling feature include, but are not limited to, a pedestal, a chevron, a rib and a dimple. One or more of these cooling features may be arranged within or outside of one or more respective cooling cavities 90 and 92.

In some embodiments, one or more of the shells 82 and 84 may each include a plurality of protrusions (e.g., rails) to which the panels 112 and 114 may be bonded. In such embodiments, the protrusions 126 may be respectively bonded to the protrusions of the respective shell 82, 84. Alternatively, the protrusions 126 may be omitted and the protrusions of the respective shell 82, 84 may be bonded to the panel bases 124.

Figure 5:
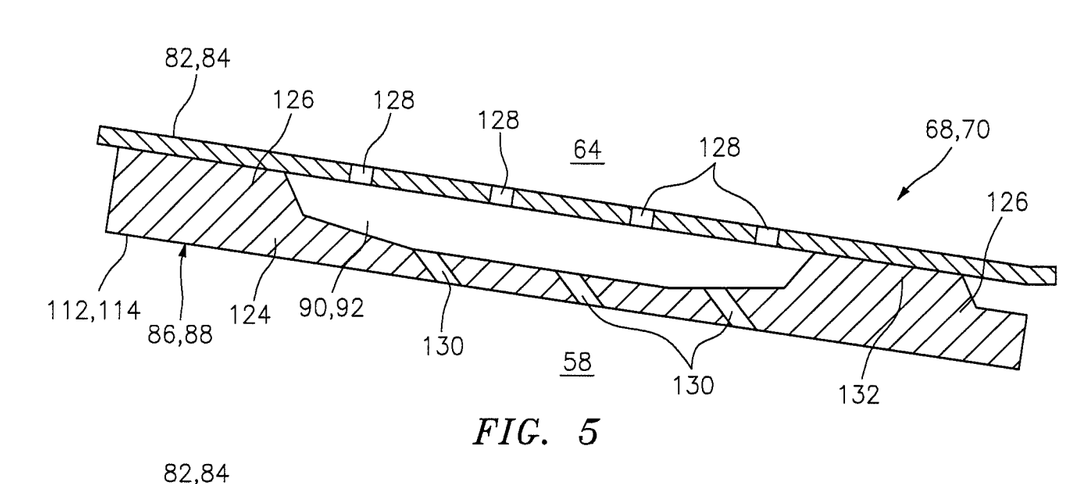
FIG. 5 is a side sectional illustration of a portion of a combustor wall.

Referring to FIG. 5, one or more of the shells 82 and 84 may each include one or more cooling apertures 128 that are fluidly coupled with the respective cooling cavities 90, 92. These cooling apertures 128 may be configured as impingement apertures, which direct air from the plenum 64 to impinge against the respective panels 112, 114. One or more of the panels 112 and 114 may also or alternatively each include one or more cooling apertures 130 and 132 that are fluidly coupled with the respective cooling cavities 90, 92. The cooling apertures 130 may be configured as effusion apertures, which provide film cooling within the combustion chamber 58 for the respective heat shield 86, 88. The cooling apertures 132 may be configured as channels that direct air axially and/or circumferentially through respective protrusions 126 (e.g., rails).

Figure 6:
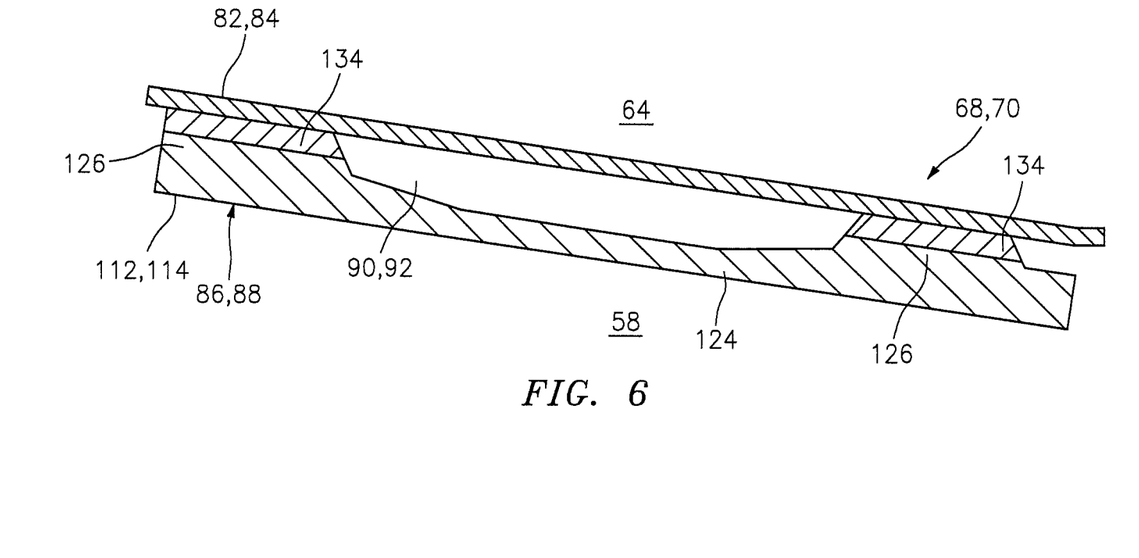
FIG. 6 is another side sectional illustration of a portion of a combustor wall.

Referring to FIG. 6, one or more of the panels 112 and 114 may be connected to the respective shell 82, 84 through one or more intermediate elements 134. Each protrusion 126, for example, may be TLP-bonded to the respective intermediate element 134, which may be TLP-bonded to the respective shell 82, 84. An example of an intermediate element is a porous metallic strain isolator. The present invention, however, is not limited to the foregoing intermediate element example.

In some embodiments, the bulkhead 66 may also or alternatively be configured with a multi-walled structure;

e.g., a hollow dual-walled structure. The bulkhead 66, for example, may include a shell and a heat shield that is directly or indirectly connected to the shell by a bonded connection in a similar manner as described above with respect to the inner and the outer walls 68 and 70.

The terms "upstream", "downstream", "inner" and "outer" are used to orientate the components of the combustor 62 described above relative to the turbine engine 20 and its axis 22. A person of skill in the art will recognize, however, one or more of these components may be utilized in other orientations than those described above. The present invention therefore is not limited to any particular combustor spatial orientations.

The combustor 62 may be included in various turbine engines other than the one described above. The combustor 62, for example, may be included in a geared turbine engine where a gear train connects one or more shafts to one or more rotors in a fan section, a compressor section and/or any other engine section. Alternatively, the combustor 62 may be included in a turbine engine configured without a gear train. The combustor 62 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A combustor wall for a turbine engine, the combustor wall comprising:
   a combustor shell extending axially along a centerline, the combustor shell formed from a first material comprising a nickel alloy; and
   a combustor heat shield extending axially along the centerline, the combustor heat shield formed from a second material that is different than the first material, and the combustor heat shield connected to the combustor shell by a bonded connection that comprises a partial transient liquid phase bonded connection;
   wherein a cooling cavity is defined radially between the combustor shell and the combustor heat shield; and
   wherein the second material comprises composite material.

2. The combustor wall of claim 1, wherein the bonded connection bonds the combustor heat shield to the combustor shell.

3. The combustor wall of claim 1, further comprising an intermediate element connected radially between the combustor heat shield and the combustor shell, wherein one of
   the bonded connection bonds the combustor heat shield to the intermediate element; and
   the bonded connection bonds the intermediate element to the combustor shell.

4. The combustor wall of claim 3, wherein one of
   the combustor heat shield is bonded to the intermediate element by a second bonded connection where the bonded connection bonds the intermediate element to the combustor shell; and
   the intermediate element is bonded to the combustor shell by a second bonded connection where the bonded connection bonds combustor heat shield to the intermediate element.

5. The combustor wall of claim 3, wherein the intermediate element comprises a strain isolator.

6. The combustor wall of claim 1, wherein one or more of
   the combustor shell includes one or more cooling apertures that are fluidly coupled with the cooling cavity; and
   the combustor heat shield includes one or more cooling apertures that are fluidly coupled with the cooling cavity.

7. The combustor wall of claim 1, wherein
   the combustor heat shield includes a base plate and a protrusion; and
   the protrusion extends radially out from the base plate, and is connected to the combustor shell by the bonded connection.

8. The combustor wall of claim 7, wherein the protrusion comprises a rail.

9. A combustor section for a turbine engine, comprising:
   a combustor including a shell, a heat shield and a combustion chamber;
   the heat shield connected to the shell by a bonded connection, and defining a portion of the combustion chamber; the shell formed from a first material comprising a nickel alloy;
   the heat shield formed from a second material that is different than the first material; and the bonded connection comprising a partial transient liquid phase bonded connection;
   wherein a cooling cavity is defined between the shell and the heat shield; and
   wherein the second material comprises composite material.

10. The combustor section of claim 9, wherein the bonded connection bonds the heat shield to the shell.

11. The combustor section of claim 9, further comprising an intermediate element connected between the heat shield and the shell, wherein one of
    the bonded connection bonds heat shield to the intermediate element; and
    the bonded connection bonds the intermediate element to the shell.

12. The combustor section of claim 11, wherein one of
    the heat shield is bonded to the intermediate element by a second bonded connection where the bonded connection bonds the intermediate element to the shell; and
    the intermediate element is bonded to the shell by a second bonded connection where the bonded connection bonds heat shield to the intermediate element.

13. The combustor section of claim 9, further comprising:
    a combustor first wall;
    a combustor second wall formed by the shell and the heat shield; and
    a combustor bulkhead connected radially between the first wall and the second wall;
    wherein the first wall, the second wall and the bulkhead define the combustion chamber.

14. A combustor wall for a turbine engine, the combustor wall comprising:

a combustor shell extending axially along a centerline, the combustor shell consisting of a metal material; and a combustor heat shield extending axially along the centerline, the combustor heat shield formed from a second material that is different than the metal material, and the combustor heat shield connected to the combustor shell by a bonded connection that comprises a partial transient liquid phase bonded connection;

wherein a cooling cavity is defined radially between the combustor shell and the combustor heat shield;

wherein the metal material is a nickel alloy; and wherein the second material comprises composite material.

* * * * *